Jan. 25, 1966 E. E. PASCAL 3,231,755
REMOTE VOLUME CONTROL
Filed Sept. 10, 1962
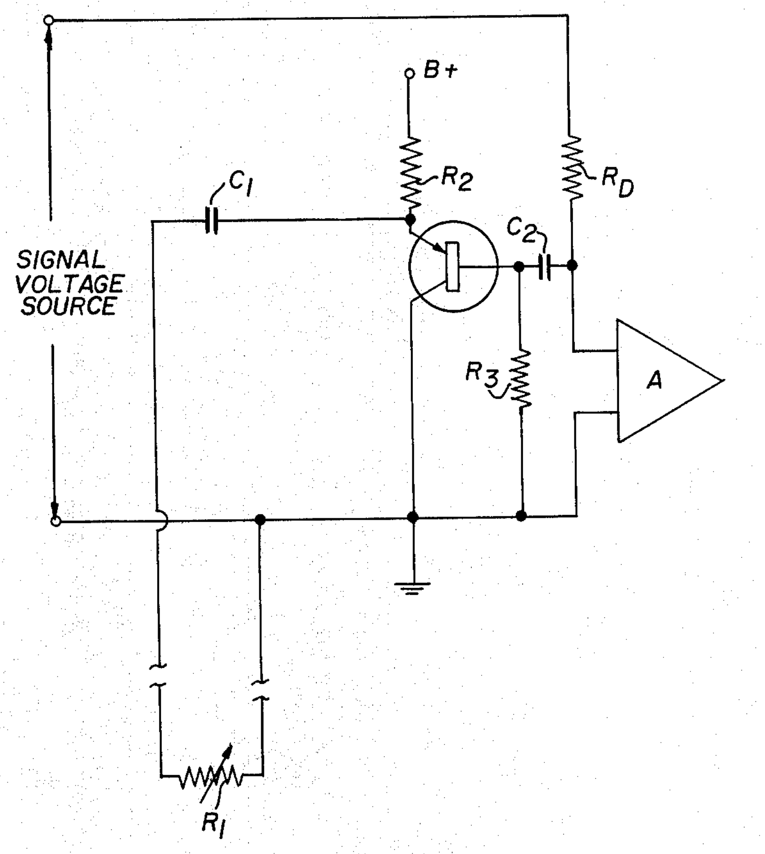
INVENTOR
EDWARD E. PASCAL
BY- Smart & Biggar.
ATTORNEYS.

United States Patent Office 3,231,755
Patented Jan. 25, 1966

3,231,755
REMOTE VOLUME CONTROL

Edward E. Pascal, Belleville, Ontario, Canada, assignor to Northern Electric Company Limited, Montreal, Quebec, Canada Filed Sept. 10, 1962, Ser. No. 222,488
12 Claims. (Cl. 307—88.5)

This invention relates to a remote volume control for signal amplification apparatus, and more particularly to such a control that can be easily adapted to function as a tone-compensated volume control, referred to as a loudness control in this specification. A loudness control is a volume control which is arranged so that, as the volume control attenuates the signal voltage, the attenuation is less for low frequencies than for middle and high-frequency components. This compensates for the lower sensitivity of the human ear to the low frequency tones relative to the middle and high frequency tones as the volume level is reduced.

Prior to this invention many remote volume controls have been proposed, but none has been entirely satisfactory. One such control uses a variable voltage divider (sometimes called a potentiometer) of the type conventionally used as a non-remote volume control, and adapts the system for remote operation by placing the voltage divider at the remote end of a long electric cable. As is the case with a non-remote volume control, the signal voltage appearing across one leg of the voltage divider is applied to the following stage of an amplifier. The signal voltage appearing across this leg of the voltage divider is a function of the ratio of the impedances of the two legs, so that as the ratio is varied the voltage applied to the following stage is varied. Usually, although not necessarily, this leg of the voltage divider is grounded.

The input impedance to a stage of an amplifier is often relatively high. In order not to cause this impedance to decrease (possibly loading down previous stages), the impedance of the voltage divider must also be high. To place such a voltage divider in the circuit at the end of a long electric cable invites hum pick-up, and also introduces capacitance to ground which causes attenuation of the high frequencies.

These disadvantages could be overcome by using a non-remote voltage divider with a remote control isolated from the rest of the system to vary the ratio of the impedances of the two legs. One attempt, although not fully satisfactory, to accomplish this has been to use a cadmium sulphide resistor as one leg of the voltage divider. The impedance of the cadmium sulphide resistor varies with the intensity of light impinging on the resistor, and the intensity of the light can be controlled remotely. The disadvantages of this system are many. The intensity of the light is very dependent on changes in the power supply, so that small power supply changes result in appreciable changes in the signal votlage applied to the following stage. Also, the intensity of the light changes with time (due, for example, to dirt accumulating on the light bulb or on the cadmium sulphide resistor), thus making it very difficult to mark positions on the control which correspond to particular volumes. Further disadvantages of this control are that it draws considerable power, there is a time lag in response, and the light bulb sometimes burns out.

The present invention overcomes the disadvantages of the above remote volume controls by using the input impedance of an emitter follower as the variable impedance for one leg of the voltage divider. The input impedance of an emitter follower is a function of its load increasing with increasing load. The load has a direct current or constant load portion and an alternating current load portion including a direct current blocking capacitor. Part of the alternating current load portion is variable and can be remote from the transistor without introducing hum pick-up or high frequency attenuation, since the load is signal isolated from the input circuit of the emitter follower, and hence from the signal voltage being applied to the following network. The signal voltage can be applied either to a following stage of an amplifier a transmission system or to circuitry such as a transformer, a reasonably high impedance transistor, a following passive network, etc.

The variable impedance leg comprising the emitter follower can advantageously be grounded, and have a direct current blocking capacitor in series with the input of the emitter follower to prevent direct current from flowing through this leg of the voltage divider (possibly due to grid current if a vacuum tube amplifier stage immediately follows the control).

If the values of both the capacitor in the alternating load portion of the emitter follower and the capacitor (if any) in series with the input of the emitter follower are large enough to pass all alternating current in a desired frequency band, the remote control functions as an ordinary volume control with no tone compensation to match the loudness contours of the human ear. If the capacitance of either capacitor or both is reduced so that the impedance it presents to low frequencies is an appreciable proportion of the total impedance of the branch containing the capacitor, the remote volume control function as a loudness control. (The total branch impedance in the alternating load portion is one case, and is the variable leg of the voltage divider in another case.)

The operation of the loudness control can be explained as follows. The impedance of a capacitor is inversely proportional to frequency; that is, the impedance is greater for low frequencies than for high frequencies. In this loudness control a capacitor is placed in series with an element which is mainly resistive in character (a variable resistor in the alternating load portion, or the input circuit impedance of the emitter follower circuit in the variable leg of the voltage divider). The impedance of only the resistive portion of the branch is variable; the impedance of the series capacitor is not. As the resistive portion decreases in impedance, the decrease is the same in magnitude for both low and high frequencies. However the proportion of the decrease with respect to the total branch impedance is less for low frequencies than for high frequencies since the total branch impedance is greater for low than for high frequencies (because of the series capacitor).

If a capacitor whose value is appropriate to make the abovementioned effect significant is placed in series with the input of the emitter follower in the variable impedance leg of the voltage divider, then as the input impedance decreases (corresponding to a decrease in the load), the low frequency components of the signal voltage across this leg are attenuated less than the high frequency components, resulting in tone compensation as the volume is reduced (assuming, of course, that it is the signal voltage across this leg which is to be subsequently amplified).

If the capacitor in the A.C. portion of the load is of such a value to make the proportional decrease in load significantly less for low frequencies than for high frequencies as the variable resistor is decreased, the cause of tone compensation is somewhat different. The input impedance of the emitter follower is a function of its load. If the load impedance decreases proportionally less for low than for high frequencies, then the input impedance of the emitter follower also decreases proportionally less for low than for high frequencies. The result is less attenuation of the low frequency components across the variable impedance leg of the voltage divider as the volume is decreased i.e. tone compensation.

The invention is illustrated in the drawing which shows a schematic circuit diagram of one embodiment of the remote volume control in conjunction with an amplifier.

In the figure, a signal voltage source is applied to a voltage divider having a constant impedance leg $R_D$, and a variable impedance leg comprising a transistor connected in emitter follower configuration. The transistor circuit has an input circuit comprising capacitor $C_2$ connected between the base and one terminal of the constant impedance leg and a base bias resistor connected between base and emitter; and a variable load comprising a constant load portion and an alternating current load portion. The constant load portion is resistor $R_2$; the A.C. portion of the load is the series connection of blocking capacitor $C_1$ and variable resistor $R_1$, connected in parallel with $R_2$. Variable resistor $R_1$ may be advantageously located remote from the transistor and thus serve as the remote controlling element. A power supply B+ is connected to the emitter of the transistor through resistor $R_2$ which provides bias to the emitter. Resistor $R_3$ provides bias to the base. The input circuit of the variable impedance leg may be connected to an amplifier, so that the proportion of the signal voltage appearing across this variable impedance leg can be amplified. The signal voltage appearing across this leg of the voltage divider is varied by varying the variable impedance portion of the load of the emitter follower—that is, by varying $R_1$. As the load is reduced, the input impedance of the emitter follower is reduced, and hence the portion of the signal voltage applied to the voltage divider which appears across this leg is also reduced.

When the control is to function as a volume control with no tone compensation, the capacitors $C_1$ and $C_2$ are large enough to pass all alternating current in the desired frequency band. To function as a loudness control in which the low frequency components are attenuated less than the middle- and high-frequency components as the volume is reduced, the value of either capacitor $C_1$ or $C_2$ or both is decreased as mentioned above.

The remote volume control of the present invention draws very little current (of the order of 2 ma.), and is quite independent of changes in the power supply voltage B+. The power supply can conveniently be taken from a system amplifier bias supply, a divider from the high voltage, or a separate power supply.

Circuit values which have been found satisfactory are as follows:

| | |
|---|---|
| $R_1$ | 100K ohm potentiometer. |
| $R_2$ | 470K ohm. |
| $R_3$ | 1 megohm. |
| $C_1$ | 50 $\mu$fd. |
| $C_2$ | 25 $\mu$fd. |
| Transistor | Northern Electric 12F. |
| B+ | 12 to 22 volts D.C. |

Approximate impedances of the circuit with the above circuit values are:

(i) 350K ohm with maximum load of 100K ohm and
(ii) 2.2K ohm with zero load,

In conjunction with a 220K ohm resistor as the constant impedance leg of the voltage divider the above circuit allows a 40 db change in the gain of a following amplifier with variations of the remote load. The insertion of the control with these components causes a 4 db drop in maximum gain of the amplifier due to the 220K/350K maximum divider values.

I claim:

1. A remote volume control for signal amplification or transmission apparatus comprising a voltage divider, across which an input signal may be applied, having a constant impedance leg connected in series with a variable impedance leg across which a fraction of said signal may be obtained, a transistor having an emitter, base and collector connected in emitter follower configuration having a base collector input circuit and a variable load the input circuit comprising the variable impedance leg, wherein variations in the impedance of said load are reflected into the input circuit so as to vary the input impedance of the variable impedance leg, the load being signal isolated from said voltage divider.

2. A remote volume control as defined in claim 1 wherein the variable load comprises a constant load portion adapted to allow direct current to traverse therethrough, and an alternating current load portion adapted to allow only alternating current to traverse therethrough.

3. A remote volume control as defined in claim 2 wherein the constant load portion and the alternating current load portion are connected in parallel.

4. A remote volume control as defined in claim 8 wherein the variable impedance element is a variable resistor.

5. A remote volume control for signal amplification or transmission apparatus comprising the base-collector path of;

(a) a voltage divider, across which an input signal voltage may be applied, having a constant impedance leg connected in series with a variable impedance leg across which a fraction of said signal may be obtained, the variable impedance leg comprising an input circuit to a transistor having an emitter, base, and collector, (b) a capacitor connected between the base and one terminal of the constant impedance leg, (c) a base bias resistor connected between the base and collector, (d) a constant load portion adapted to allow direct current to flow therethrough, having one terminal connected to the emitter, (e) a source of bias connected between the other terminal of the constant load portion and the collector, (f) and an alternating load portion comprising a capacitor in series with a variable impedance element, connected between the emitter and collector.

6. A remote volume control as defined in claim 5 wherein the constant load portion comprises a resistor.

7. A remote volume control as defined in claim 5 wherein the variable impedance element comprises a variable resistor.

8. A remote volume control as defined in claim 2 in which said alternating current load portion comprises a first direct current blocking capacitor in series with a variable impedance element.

9. A remote volume control as defined in claim 2 in which the constant portion of the load is a resistor adapted to provide bias to the emitter.

10. A remote volume control as defined in claim 8 in which a second direct current blocking capacitor has one terminal connected to the input circuit to the emitter follower and its other terminal to the constant impedance leg.

11. A remote volume control as defined in claim 10 in which said first capacitor is of such value as to pass all frequencies in a desired frequency band, and said second capacitor is of such value as to present higher impedance to the low frequencies in the audio range than to middle and high frequencies, so as to cause the remote volume control to attenuate middle and high frequencies to a greater extent than low frequencies of the audio range, as the variable impedance element of the alternating current load portion is decreased in impedance.

12. A remote volume control as defined in claim 10 in which said first capacitor is of such value as to cause the alternating load portion to present higher impedance to low frequencies of the audio range than middle or high frequencies, and thus cause the remote volume control to attenuate middle and high frequencies in the audio range more than low frequencies in the audio range as the variable impedance element of the alternating current portion of the load is decreased in impedance.

References Cited by the Examiner

UNITED STATES PATENTS

| | | | |
|---|---|---|---|
| 2,226,255 | 12/1940 | Percival | 330—193 |
| 2,377,121 | 5/1945 | Bachman | 179—1.2 |
| 2,541,322 | 2/1951 | Barney | 333—32 |
| 2,984,753 | 5/1961 | Della Salle | 307—88.5 |

ARTHUR GAUSS, *Primary Examiner.*

JOHN W. HUCKERT, *Examiner.*